April 6, 1937. J. W. MORSE ET AL 2,076,347
AUTOMOBILE WHEEL ALIGNING APPARATUS
Filed Jan. 28, 1933 6 Sheets-Sheet 3
Fig. 5.
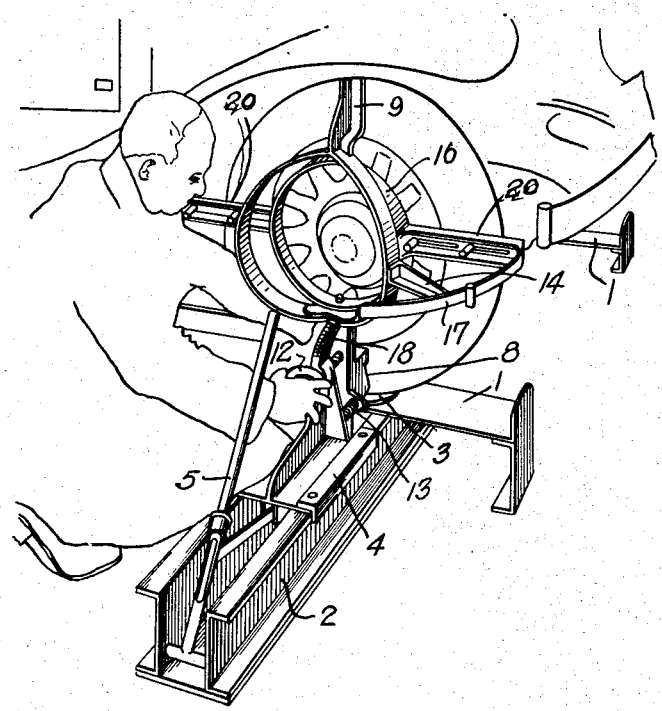
Fig. 6.
Fig. 7.
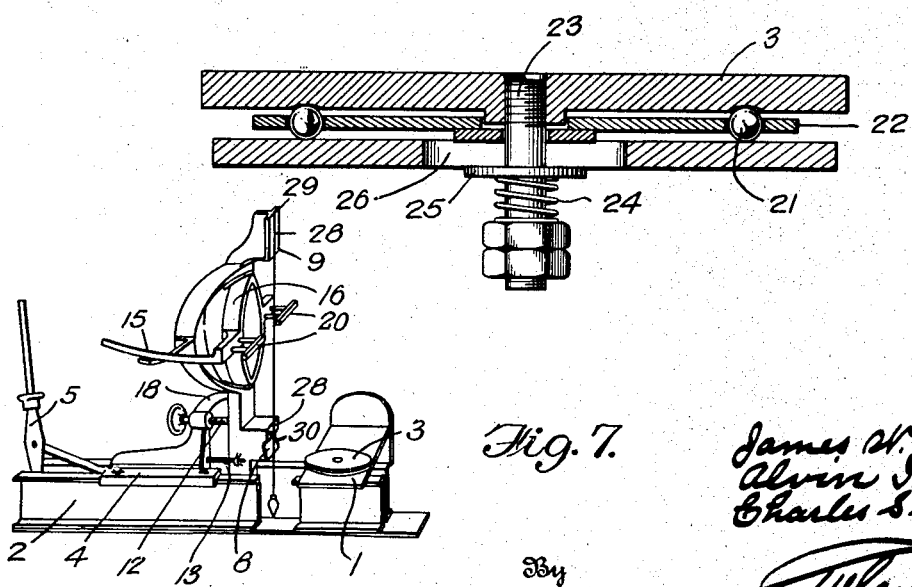
Inventor
James W. Morse
Alvin J. Moore
Charles S. Phillips
By
Graham
Attorney April 6, 1937.   J. W. MORSE ET AL   2,076,347
AUTOMOBILE WHEEL ALIGNING APPARATUS
Filed Jan. 28, 1933   6 Sheets-Sheet 5

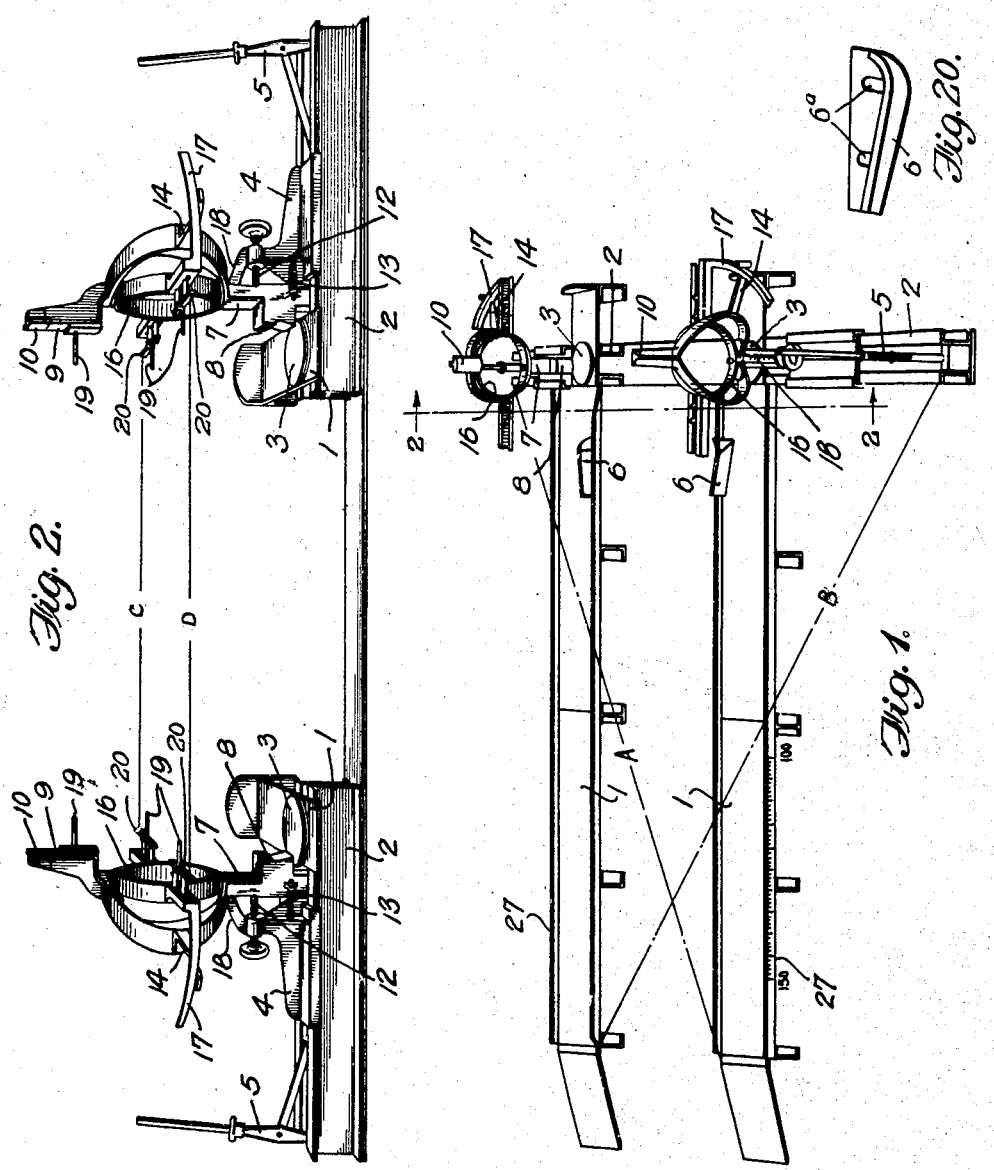

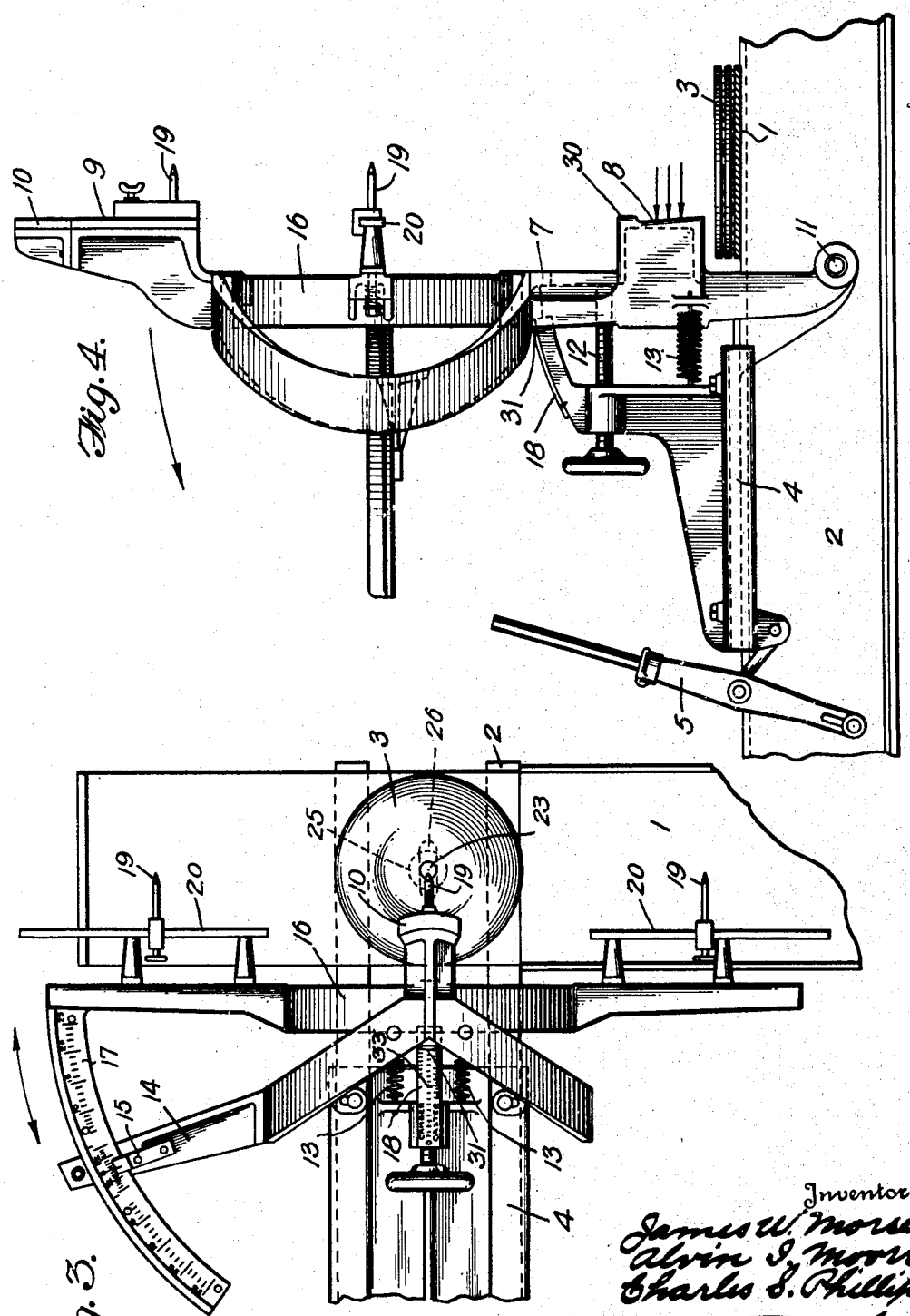

Inventor
James W. Morse
Alvin J. Moore
Charles E. Phillips

Graham
Attorney

April 6, 1937.  J. W. MORSE ET AL  2,076,347
AUTOMOBILE WHEEL ALIGNING APPARATUS
Filed Jan. 28, 1933   6 Sheets-Sheet 6
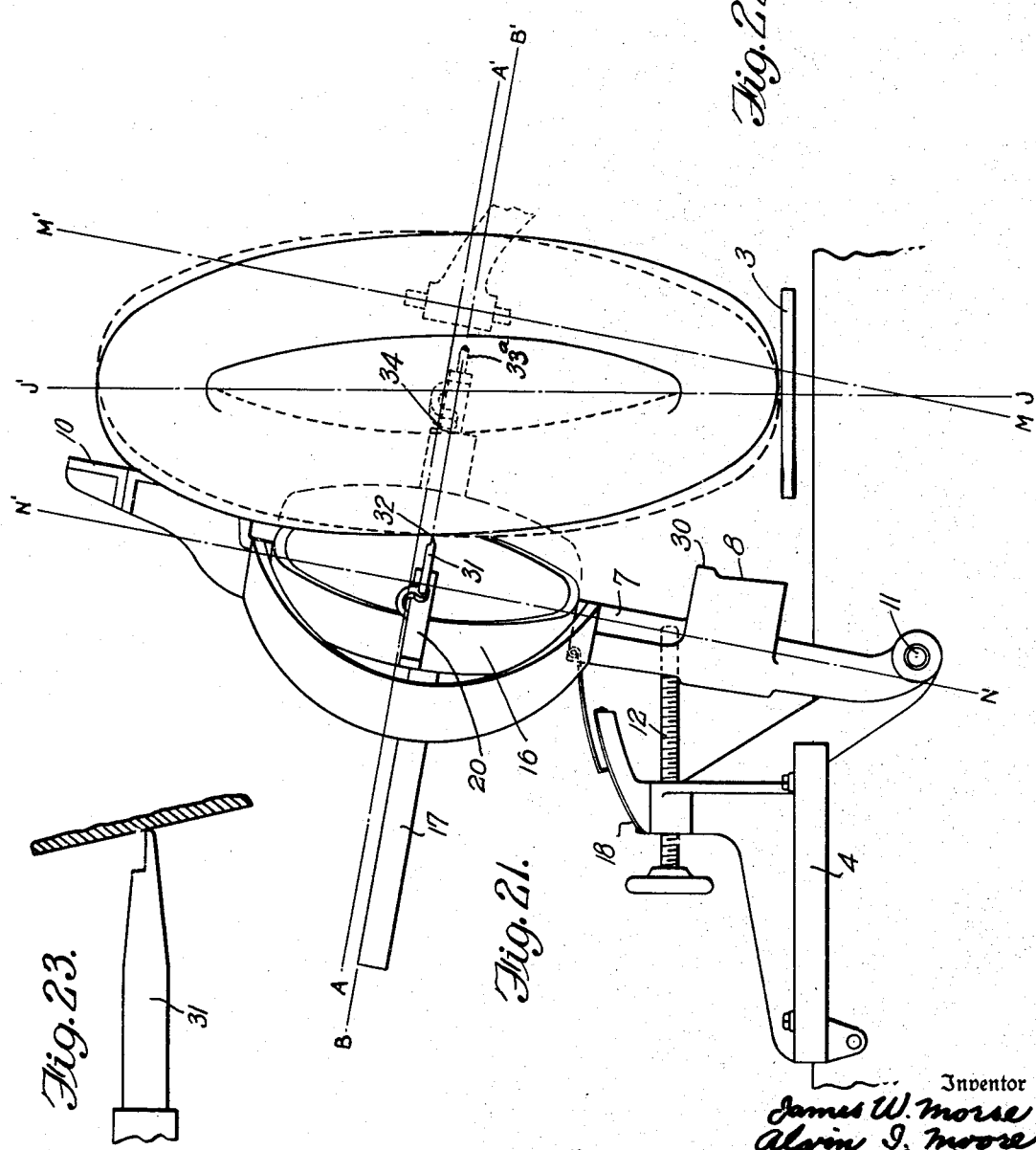

Patented Apr. 6, 1937

2,076,347

UNITED STATES PATENT OFFICE 2,076,347

AUTOMOBILE WHEEL ALIGNING APPARATUS

James W. Morse, Alvin I. Moore, and Charles S. Phillips, Lansing, Mich., assignors to Food Machinery Corporation, San Jose, Calif., a corporation of Delaware Application January 28, 1933, Serial No. 654,060

3 Claims. (Cl. 33—203)

This invention relates to an apparatus for measuring the alignment characteristics of automobile wheels and is particularly adapted to the checking and testing of camber, king pin inclination, caster, toe-in, toe-out on turns, or steering geometry and is adapted to check the individual angles of these several adjustments through the medium of a single unitary apparatus when applied to the wheels.

Before beginning the checking and testing of automobile wheel alignments and adjustments it is necessary that certain standard conditions be established so that the tests when completed will indicate accurate and consistent results.

There are two principal factors relating to the checking and correcting of the front end of an automobile that are sometimes disregarded by those who are not entirely familiar with the interrelationship of the various front end settings. These factors are, checking the car with the weight on the wheels and having the car level when checks are made. It has been proven that these factors must be included in the checking, otherwise the interelationship of camber, caster, toe-in and so forth is broken up.

Wear and play in the bearings or bushings, also axle spring or sag, and there always is some, allows the wheels to take one position when the weight of the car is on the wheels and a different position when the weight is off the wheels, therefore, the weight of the car must be on the wheels when measurements are made because we are trying to correct the front end so that the car will operate properly when on the road.

The accurate leveling of the car is a condition that is cared for in the installation of the apparatus, which is carefully leveled as installed and remains in that condition indefinitely without further attention, unless abused or misused during operation.

Another factor that is important is that the tires must be inflated to a proper predetermined pressure to insure a proper leveling of the car axle, and since in making some of the tests the bulge of the tire at the ground must be compensated for and some of the tests are made on the sides of the tires, it is necessary that the full weight of the car be on the tires during the tests to permit accurate and consistent results being obtained.

The front wheels of automobiles have adjustments including caster, camber, toe-in on the straight ahead and toe-out or steering geometry on the curves or turns, and since it has been found that the testing of these adjustments should be made with the weight of the entire car on the wheels, provision has been made in this apparatus to so rest the wheels that no possible binding will occur when the tests are being made, or when the adjustments are being changed to accord with predetermined practice.

Means has also been provided for quite accurately centering the front wheels of the car with the apparatus when the car is driven thereon, and this means is also adjustable for different width treads.

When a car is placed on the apparatus of this application all checking and correcting of camber, caster, king-pin inclination, toe-in on the straight ahead, and toe-out on turns is completed without moving or changing the position of the car which is vital to a correct diagnosis and correction of the adjustments if any are found necessary.

Heretofore it has been impractical to make the checks and tests for wheel alignment with the weight of the car on the wheels because of the possibility of the wheels binding on the supporting surface when the camber or other adjustments were made, without thereafter moving the car back and forth to remove the binding. This moving of the car so changed the original position of the car relative to the checking apparatus that the next check did not coincide with the previous check and as a result of this condition certain tolerances were permitted that removed all possibility of ever having the alignments in perfect adjustment. The present device obviates this difficulty entirely, all adjustments and changes can now be made without moving the car at all as has been stated.

In order to have a clear understanding of the alignments and adjustments necessary in front wheel aligning in automobiles it might be well to state here the exact meaning of the several conditions.

*Caster.*—Is the amount in degrees of the backward tilt of the axle and king-pin.

*Camber.*—Is the amount in inches or degrees that the front wheels are tilted outward at the top.

*King pin inclination.*—Is the amount in degrees that the tops of the king pins are inclined toward the center of the car.

*Toe-in.*—Is an adjustment whereby the distances between the front wheels is less at the front than it is at the rear.

*Toe-out (steering geometry).*—Is the mechanics of keeping the front wheels in relative alignment as they are turned right or left. When driving on a curve the wheels go into a toe-out position, farther apart at the front of the tire than they are at the back. This increases with the increasing of the turn.

A car without caster—that is with king-pins vertical—would lack steering ability and would tend to wander over the road unless stability were provided by means of king-pin inclination. Unequal caster in the two front wheels shows itself in a tendency of the car to pull to the right or left. This condition comes about through the axle having been twisted so that there is a greater amount of caster in one king-pin than in the other. The direction in which the car will tend to pull is away from the wheel with the most caster. Axles with negative caster result in a car that is difficult to steer, that tends to shoot to the right or left and will turn a corner easily but is hard to straighten out at the end of a curve.

The need for camber in a car is principally due to the type of front axle used in automobiles. The weight of the front end of a car is carried on an axle that, instead of being rigid, is jointed at a point inside of where the wheel rests on the ground. The result of this is the tendency of the wheel to fall inward at the top, putting a severe twisting strain on the king-pin which makes steering hard and might be dangerous if some means were not taken to off-set it. The remedy which was devised was to bring the point, where the wheel rests on the road, in under the king-pin, by tilting the top of the wheel out and consequently in at the bottom. By this deviation of the wheel from the vertical it has become possible for the wheel to run in approximately balanced freedom on a short spindle shaft, supported only at the inner end, the outer bearings being used only to take up thrust. This was considered a perfect camber setting under the old conditions of high pressure tires and vertical king-pins. The downward pull of the car's weight was exerted lengthwise of the king-pin, that is, straight down, the load being carried on the king-pin thrust bearings, while there was little or no side strain on the pin itself.

With the coming of the balloon tire, a new situation developed that required an almost complete redesigning of the front axle assembly. When it became evident that any considerable amount of camber was ruinous to front wheel balloon tires, many of the manufacturers reduced the camber on their cars, but in doing this it became also necessary to devise some means of avoiding the shearing twist on the king-pins. The solution was to tilt the king-pin inward from the vertical—to give them inclination—thus came king-pin inclination. King-pin inclination tends to keep the wheel spindles pointed outward, in line with the axle, just as caster tends to keep the wheels pointed straight ahead. The effect is the same, since if the spindles are kept pointing out at right angles to the car, the wheels will, as a result, be kept pointing ahead.

Toe-in is a necessity, growing out of camber and directly related to it. It might seem that since the wheels are headed inward toward the center of the road, while actually traveling a parallel course, there must be a constant grinding of their treads on the road surfaces. It would appear that they are being held apart constantly by the axle, against their tendency to roll inward to the same point. As a matter of fact, it is to avoid this tire wearing surface grind that toe-in is employed. Without it, if wheels are cambered, tires would be quickly worn out by road surface grind. The tire on a cambered wheel, compressed more by the road on the outer side than on the inner side tends to constantly curve outward. By toeing the wheels inward, this tendency is overcome and road surface friction is reduced to the lowest possible point. Toe-in must be adjusted in accordance with the amount of camber. High camber requires high toe-in. Low camber, low toe-in.

Toe-out on turns (steering geometry), is necessary because of the pivots in the axle just inside the wheels. The front wheels of a car when making a turn are not on the same radius line, drawn from the center around which the car is turning, and because of this, it is necessary for the wheels to assume a toed-out position.

The importance of the wheels being in proper alignment on the turns can scarcely be overemphasized. When it is considered that fully 60% of the car's travel is done with the wheels turned more or less from a straight ahead position, especially in city driving, it is easy to understand how absurd is the practice of merely lining up the wheels with the toe-in gauge for straight ahead movement and giving no consideration to their position on the curves. When the car is going around a curve the centrifugal force throws the weight of the car on the outside wheel, the car, therefore, travels in a curve governed by the outside wheel, and the inside wheel, due to improper toe-out adjustment, having been turned beyond or short of its proper position, is forced into a side drag that causes extremely rapid tire wear. This condition is sometimes so severe that a distinct whistle or squeal is heard when the car rounds a curve at fair speed, caused by the grinding of the road surface against the tire tread. The wheel of any car, if properly set on the curves, will be at right angle to the radius line from the center around which the vehicle is turning. For example, a car with a hundred inch wheel base and the outside wheel is turned twenty degrees to the left from the straight ahead position, the inside wheel must turn an additional four degrees, or twenty-four degrees to assume its proper relative position. The greater number of degrees that the inside wheel must turn, as compared with the outside wheel, depends upon the length of the car's wheel base. The mechanical means used to give the inside wheel, left or right, a greater degree of turn on the curves is the setting of the spindle or plane arms at an angle instead of straight back.

The foregoing explanation of the several adjustments necessary for proper wheel alignment prepares the reader's mind for the necessity of accurate and dependable devices for checking and testing these adjustments, so that we may now pass to a consideration of the invention disclosed by this application.

Describing briefly, the apparatus disclosed by this application, we find channel section runways on which the car is driven and which runways are installed perfectly level so that this condition is constant for all cars. Near the front end of the runways are adjustable centering guides that automatically guide the front wheels onto the apparatus and position them accurately for the tests and checks to be made. Ball bearing turntables are located at the front end of each runway, and which have lateral movement, on which the wheels rest during the checks and corrections of alignment. The front end of each runway is supported on a cross beam of heavy and rigid construction, on which are mounted for cross movement, the checking devices which have lateral movement toward and away from the positioned wheels. The turntables are so mounted that they are substantially self centering, or easily centered by hand as the wheels roll thereon, and are substantially self centering as the wheels are given turns to check the steering geometry. Along the outer sides of the channel runways are scales by means of which the substantial wheel base of the car may be visually determined by observing the location of the rear hubs over the scales. To make a more accurate reading a small plumb and string may be employed. Besides determining the wheel base of the car these scales are also useful in determining whether the frame is sprung or diamond shape, whether the spring horns are bent, whether there are broken spring U bolts and other misadjustments or defects. After the car is properly positioned on the apparatus the tests and checks are begun by a proper manipulation of the checking devices mounted on the rigid cross member.

It is an object of the invention to provide an apparatus for checking the wheel alignment characteristics of automobile wheels while the weight of the car is on the wheels.

It is also an object of the invention to provide an apparatus which will automatically align and center the front wheels of an automobile when driven thereon.

It is also an object to provide an apparatus wherein the front wheels are resting on self aligning anti-friction surfaces while the checks are being made.

It is a further object of the invention to provide an apparatus for checking and correcting the alignment of automobile wheels wherein the checking may be made against the sides of the tires or against the wheel felloes.

It is a further object of the invention to provide means for determining the wheel base of a car by simple visual observation.

It is a further object of the invention to provide means for determining if the car frame is sprung; if spring horns are bent or spring U bolts broken.

It is also an object of the invention to provide an apparatus for checking the alignment characteristics of the front wheels of automobiles wherein alignment characteristics of the apparatus itself may be checked and determined during installation or may be checked at intervals after installation to determine any misalignment occurring from abuse or misuse.

It is also an object of the invention to test the alignment characteristics of the rear wheels of automobiles as well as the front wheels and by the same apparatus.

It is a further object of the invention to provide an apparatus for testing the alignment characteristics of automible wheels wherein the testing devices may be adjusted to a wheel and remain in such adjustment while any misalignment is being corrected so that the operator at all times is able to see exactly how much or how little is the change in adjustment being made.

With such objects in view as well as other advantages inherent in the invention, the novel structural peculiarities, novel organization of elements, and the separate and collective operations involved in carrying out the recited objects of the invention, which will be made the subject matter of claims, it is to be understood that the several necessary elements and combinations constituting the same may be varied somewhat in their proportions, placement, general arrangement and operative relation without departing from the scope and nature of the invention. In carrying out the objects of the invention in a concrete form or apparatus, further objects, advantages and improvements may have been evolved than have been recited, and in order to make the invention more clearly understood, there are shown in the accompanying drawings means and mechanism embodying the preferred disposition of the different parts and combinations, in which has been illustrated one way of embodying the creative part or concept of the invention. The described devices are simply embodiments of the invention which other structures might also employ, and some of the parts and combinations may be used without the others in different types of such apparatus without departure from the purview of the invention so that the applicants are entitled to such variations from the described and shown devices as may fall within the scope and meaning of the claims.

Reference now being had to the accompanying drawings a better and clearer understanding of the various phases of the invention will be had. The drawings are more illustrative than as accurate to details of construction and some parts may have been more or less exaggerated as to size or location to better disclose the operative principles.

Figure 1 is a top perspective of the complete apparatus.

Figure 2 is a sectional elevation taken on substantially the line 2—2 of Figure 1.

Figure 3 is an enlarged plan of one of the checking units and a part of the supporting frame work.

Figure 4 is a side elevation of Figure 3.

Figure 5 is a perspective detail illustrating the positioning of the checking unit to one of the front wheels of a car.

Figure 6 is a sectional detail of the turn table support and showing the slotted mounting which permits the turntable to be self centering when a wheel is turned.

Figure 7 is an elevation in perspective showing how the installation of the apparatus is checked for accuracy during or after installation, this check applying only to the movable checking unit.

Figure 20 is a plan view of the guide block 6 showing the slotted holes for lateral adjustment to accommodate differing tread widths.

Figure 21 is a view showing the apparatus in relation to a front wheel when making a test of king-pin inclination.

Figure 22 shows the manner of clamping the wheels to the brake while the king-pin inclination tests are being made.

Figure 23 is a detail of the indicating finger for making accurate contact with the tire in king-pin inclination tests.

Figure 8:
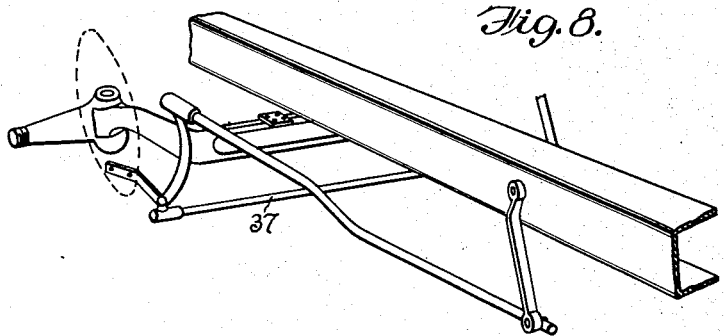
Figure 8 is a perspective view of one side of the front end of the steering and wheel supporting parts of a car with the several parts numbered and named in the specification so that the terms used in the further description of the invention will be understood.

The numeral 1 represents the channel section runway onto which the car is driven for checking the alignment of the front wheels. 2 represents the cross member which coacts with the channel members and which supports the checking devices for opposite wheels. 3 represents the ball bearing turntables on which the front wheels rest and center during the checking operation. 4 indicates the sliding bases on which are mounted the checking devices proper. 5 are adjusting handles and link means for moving the bases 4 along the members 2. 6 are the wheel centering devices located on the inner sides of the channels 1 and which act to guide the wheels substantially central on the turntables 3. The centering devices 6 are adjustable laterally to accommodate differing tread widths by means of the slots 6a. The checking devices comprise bracket members 7, having an angular face against which the bulge of the tire contacts as at 8, and a contact face 9 at the top for contacting with the top side of the tire. An extension piece 10 provides additional contact surface for extra large tires. The brackets 7 are pivoted at 11 with the base member 4. Adjusting screws 12 and springs 13 serve to manipulate the brackets 7 and hold them in the desired position. The brackets 7 carry indicator arms 14 with an adjustable indicator plate 15. Rotatably mounted in the brackets 7 are members 16 carrying scales 17 on which readings for toe-in and toe-out are made. The base members 4 carry scale plates 18 on which are scales for reading camber, caster and king-pin inclination. These scales will be referred to and given proper characters, in the operative description. Readings for caster may also be made on scale 17 about which more will be said. The rotatable members 16 carry felloe and tire contact devices 19 and 20. The ball bearing turntables comprise a top plate 3, a lower plate 3a, balls 21, ball retainer 22, stud 23, compression spring 24 and washer 25 for covering the slotted hole 26 in the channel member 1.

Since the installation of this apparatus vitally affects the future operations of testing and correcting the misalignments of automobiles it is desirable that a brief description of the manner of installation and the manner of checking the accuracy thereof be given.

By referring to Figs. 1, 2 and 7 the installation checks will be described.

The channels 1 and the cross member 2 must be truly at right angles and in order to effect this condition the check lines "A" and "B" must measure equal. If the first placement of these parts does not check equal then they must be shifted until they do.

After the foundation members are installed and check properly for alignment the positioning of the testing and checking units that slide laterally of the device must be checked for alignment. The bars 20 carried by the members 16 must be set parallel by making the dimensions "C" and "D" measure the same. This should bring the pointer 15 to check accurately with the zero mark on the scale 17, Fig. 3. If it does not check accurately it should be shifted until it does so check. The marker 15 may be shifted slightly by loosening the screws securing it to the arm 14, through the medium of enlarged holes, and then clamped in proper position, and this must be done on each unit.

Each unit is then checked for vertical adjustment by the manner shown in Fig. 7 where a plumb line must align with a vertical line scribed on the face of the unit as at 28, the plumb line at the same time just touching both of the faces 9 and 30. When this condition is reached the pointer riding over the scale 18 should rest on the zero mark, if it does not it also may be adjusted by loosening the clamping screws and shifting it to proper position.

This invention is designed to go into garages or on construction floors and to be used for all sorts of checking and testing of automobiles, and when used in garages for testing and checking the alignment of wheels on everyday cars in use by the public there is a certain inspection routine that should be followed before attempting to check the important adjustment of the wheels. Cars that have been driven by the general public may have any number of misalignments and misadjustments not calculated to be found by an apparatus of this description but which nevertheless, have a very great bearing on the final adjustments determined by the use of this device, and the final and proper setting of the wheel alignments. The following routine should be generally followed when a car is presented for checking that has had road service.

First see that all extras such as shimmy stops etc., are removed from the front axle assembly. Jack up the front wheels so they can spin freely, then rotate the wheels and see that the wheel and rim run true within a $\frac{1}{32}$ of an inch. Check tires by holding a piece of chalk against tire side wall while tire is spinning. The chalk will make a wide mark where the tire runs out and will miss where the tire runs in. Do this with both tires. Determine whether the wheel or rim is out of alignment or the hub bent. The wheel rims must be true and straight on the wheels. Test the front wheel bearings, king bolts and bushings by placing one hand on top of the tire and the other on the extreme bottom of tire and shaking the wheel in and out to find play. If play is found of $\frac{1}{8}$ inch variation or more, it would indicate approximately 1/64 inch play in pin and bushings. If this much play exists replace king bolt and bushings. In this test do not confuse loose wheel bearings with a worn king pin and bushings. Swing front wheels from side to side to find any binding or looseness in the steering assembly.

Test the tie rod pins and bushings by standing directly in front of the car, and, placing a hand on each tire pull inward and press outward. This will disclose any play and if it is more than $\frac{1}{16}$ of an inch it should be removed by adjustment or replacement of parts. Check drag link position. If this is not correct proper toe-out on the curves cannot be obtained. Check steering gear assembly by seeing that steering wheel is tight in its mounting. Examine sector shaft bushing, eccentric and worm. See that there is no end thrust in the sector lever and no end thrust in the worm. Most all assemblies are provided with adjustments so that any looseness can be taken up. See that the steering gear housing is tight on the frame. Examine ball joints for play or broken thrust springs which are located at both ends of the drag link. A weak or broken spring can usually be detected by turning to the extreme right. There should be just sufficient play to permit free steering. If shackle bolts are loose or worn they should be tightened or replaced. Check for spring sag. Spring sag can easily be checked when the car is standing perfectly level by measuring with a short rule from the spring saddle to the frame directly above. Excessive sag not only affects riding qualities but affects steering angles and causes hard steering and shimmy. Uneven sag throws the car off balance. If springs sag too much it would be advisable to replace them. If one sags more than the other it may be possible to make correction by re-arching the spring. Wheel spindles should be checked before attempting to make camber checks or adjustments. Very often spindles are bent causing improper camber readings, also changing king pin inclination. If king pin inclination is not alike on both sides of car it cannot perform properly. Camber should not be changed until it is certain that spindles are correct. A check of the spindle plane arms can be made at the time toe-out on the curve is checked as a bent or sprung arm will show up in this check.

The foregoing gives a general idea of the structural features of the invention but it is thought that the balance of the description may best be embodied along the lines of an operative description wherein further details of structure will be referred to.

There are five general tests that are made with this instrument aside from some minor tests, and they will be treated in the order in which they are mentioned on page 3 of this specification.

*Caster*

In checking the caster of a wheel scales are used in connection with the apparatus. The manner of calibrating and producing these scales is very clearly described in a co-pending application filed by one of the present applicants and having Serial No. 564,097. This application may be referred to for this data, which also describes the making of the scales for other readings as well.

The caster adjustment of a wheel is properly determined by taking two readings, one with the wheel turned 25 degrees out and one with the wheel turned 25 degrees in from a straight ahead position and the first reading subtracted from the second which will give the caster of the wheel in degrees, which is the amount the top of the king pin is tipped back from a vertical line. The position of the operator for taking a caster reading is substantially that of Figure 5, the readings being taken on the scales 17 and 18.

Figure 9:
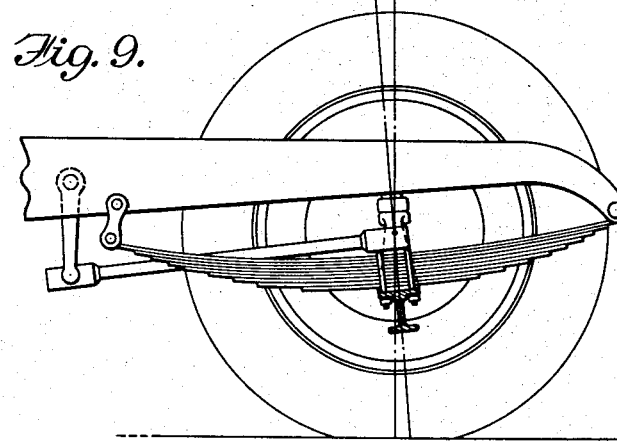
Figure 9 is an illustration showing how the caster of a wheel is increased.
Figure 10:
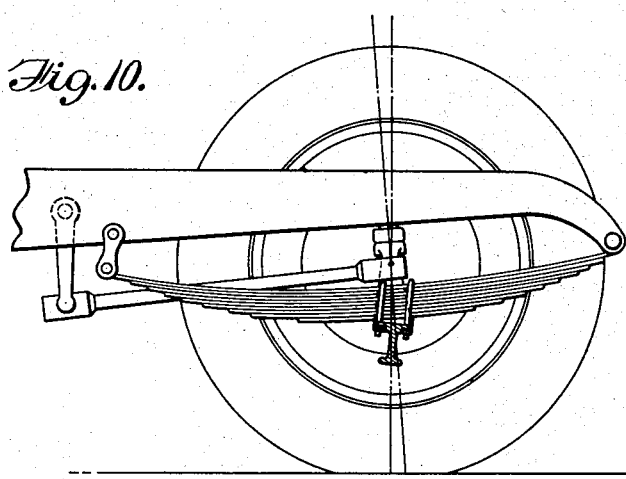
Figure 10 shows how the caster of a wheel is decreased.
Figure 11:
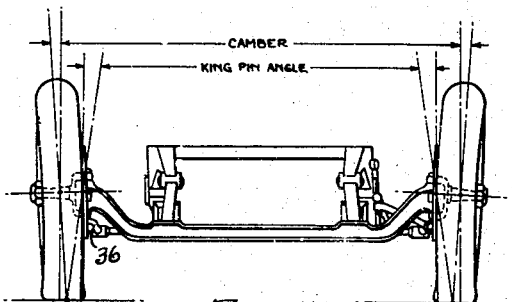
Figure 11 is a diagrammatic view showing the camber and king-pin inclinations as applied to the front wheels of a car.

In making the first check for caster the wheel is turned out until the pointer on the scale 17 rests at 25 degrees on the inner end of the scale 17. The contact bars 20 on the horizontal arms of the member 16 are the ones used in this setting, and they are made to bear against the tire to determine the 25 degree angle for the out position of the wheel. When the wheel has been set accurately to the 25 degree position a caster reading is taken from the scale 18 and jotted down. The wheel is now turned to the 25 degree "in" position by setting the pointer 15 to the outer number 25 on the scale 17, the final adjustments being made in these settings by means of feelers, which are thin strips of metal or other material, held in the operator's hands and slipped between the tire and the bars 20 until the "feel" is the same at top and bottom. When the adjustment is complete another caster reading is taken from the scale 18 which will be a different degree reading than the first reading. This second reading is now subtracted from the first reading and the difference is the caster inclination of the king pin. If these checks indicate that the caster is not correct for this car, proper correction is made by placing "shims" under the springs as shown in Figs. 9 and 10 to increase or decrease the caster according to requirements. Each time a "shim" is applied the caster of the wheel should be again checked to ascertain when the angle of inclination of the king pin is correct in degrees for the desired caster.

Since it is impossible to turn the front wheels of all cars the same number of degrees, we have designed the caster scale so that an accurate reading of caster will be given at 25 degree settings both "in" and "out" as mentioned above.

If 2 degrees should be the desired caster angle and we find that the left side shows 1½ degrees while the right side shows 1 degree, it would then be necessary to use a ½ degree caster shim under the left spring which would increase the caster to its original 2 degrees, while on the right side it would be necessary to use a 1 degree caster shim in order to bring that side up to the original 2 degree setting. If there is a difference of more than 1 to 1½ degrees in the two axle end readings, it will probably be necessary to take the axle out of the car to have the ends straightened and readjusted to the original 2 degree settings. Anything under about 1 degree can be corrected by using the shims under the springs. Quite often it may be found necessary to use shims of extra degrees to make the desired corrections, since the axle is mounted on flexible spring saddles there is a certain amount of spring back. In other words, to correct a ½ degree variation it may be necessary to use a ¾ degree or even a 1 degree shim.

Caster settings should always be made as closely as possible to the manufacturers' recommendations. If it is impossible to find the manufacturers' recommendations a caster setting of from ½ to 1½ degrees will give satisfactory steering usually free from shimmy. Too much caster makes the vehicle hard to steer and is quite apt to cause shimmy. Not enough caster, or reverse caster, causes the front wheels to "dive" or "wander" and the vehicle must be steered continually. In order to have the car steer and run properly it is important that the caster of both front wheels is alike.

Since caster effects relative toe-in and steering geometry it is recommended that caster be checked and corrected as a first operation.

*Camber*

Camber is the amount in degrees that the front wheels of an automobile are inclined outward at the top. Camber is often reduced by axle sag, bearing play or king pin or bushing clearance. If these conditions exist they must be corrected as previously stated, before camber tests or checks are made.

The first step in making a camber check is to set the wheel truly straight ahead. This is accomplished by setting the wheel as nearly straight ahead as possible by the eye and then moving the testing unit up to the wheel and finishing the setting by means of the reading scale on the scale arm 17. The wheel will be truly straight ahead when the faces 20 on the member 16 bear against the sides of the tire and the pointer 15 registers zero. To get a fine adjustment use the feeler gauge. Now that the wheel is truly straight ahead the unit may be tilted by the hand wheel and screw 12 as is shown in Fig. 5 and the unit adjusted to the tire until the faces 8 and 9 contact with the tire, again using the feeler gauge to get a fine setting. The pointer 31 will now register on the scale 18 the degrees the top of the wheel is tilted outward. The desired camber setting is determined by having a certain point of the tread resting on the ground, coincide with the points of contacts of the caster and king pin inclination. In other words all of these points should focus at the same tread point. This will be dealt with in more detail when discussing toe-out on the curve or steering geometry. If from the camber check it is found that the camber should be changed the correction is made by bending the axle between the wheel and the spring saddle. This is accomplished by powerful bending devices that need not be specifically described in this application. The camber must check the same for both front wheels.

Since the checks are made with the tires resting on the supporting turntables and carrying the weight of the car the "bulge" of the tire at the bottom must be compensated for in making the checks for camber.

Fig. 4 indicates how the tire bulge is taken care of in the tests.

The face 8 positioned just above the turntable 3 is shown to be inclined slightly from the vertical and the three arrows indicate where possibly three bulges on different size tires might contact when the checks are being made.

In determining the proper angle for this face 8 the different size tires were measured with the air pressure recommended by the manufacturers and the cross section of the tire at the bulge recorded. Each tire was then measured with the car jacked up so no weight was carried by the tire, these measurements were recorded and the difference between the two cross section measurements gave the deflection caused by the weight of the car, for each size tire. We started with 4.75 which is the smallest tire and went through the 5.00, 5.50, 6.00, 6.50 and up to the 7.50 inch size. We found that the bulge increased in direct proportion with the increase of tire diameter. We then located the points of contact of the different size tires with the face 8 which we were to incline and after finding these locations a simple chart determined the exact angle to make the face 8 so that each size tire would contact at the proper point to give an accurate determination.

In the inspection routine referred to it was mentioned that the tires be revolved rapidly and a chalk mark made to show the high and low sides of runout. When the camber test is made the chalk mark should be at the front of the wheel, and if more than one mark appears the longest one should be at the front.

If in checking camber it is found that a correction is necessary by a bending of the axle between the spring pad and the wheel, this change should be delayed until the king-pin inclination is checked, since an incorrect king-pin inclination would be the cause of an incorrect camber. The next test to be made in a proper sequence of checks should be a check of king-pin inclination.

King-pin inclination

King-pin inclination tends to keep the wheel spindles pointed outward, in line with the axle, just as caster tends to keep the wheels pointed straight ahead. The effect is the same, since if the spindles are kept pointing out at right angles to the car, the wheels will, as a result, be kept pointing ahead. Because of this fact, a high degree of king-pin inclination in the later model cars with the larger tires has made it possible to reduce the amount of caster and so safeguard against certain types of shimmy which results from too much caster.

By referring now to Figs. 21 and 22 we can describe the manner and procedure of making a king-pin inclination test.

The car is placed on the aligner with the front wheels centered on the turn-tables 3 in the usual manner. In Figure 21 the full line of the wheel indicates a turned position to a setting of 20 degrees as indicated on the scale 17, while the dotted line of the wheel indicates the wheel set to a 20 degree position on the other side of the scale 17. A setting of 20 degrees of the wheel for this check has been found convenient and is recommended.

It is necessary to lock the wheel against rotation during this check and this is accomplished by the little clamp shown in Fig. 22 which clamps the brake drum flange and thus holds the wheel from rotating.

Both of the front wheels should be raised during this check so the bottoms of the tires just touch the turn-tables 3 which levels the axle within satisfactory limits and insures that the wheels will not turn on the spindles, thus assisting the clamps to hold the wheels from turning.

A special pointer having a flat face indicating the center line of the pointer is used on the bar 20 when making this test, so that an accurate setting to a line made on the tire will be possible. On the other bar 20 a regular felloe test pointer is used to contact with the tire on the opposite side of the wheel in each 20 degree setting. This facilitates the use of the 20 degree angle for the check.

To begin the checking of the king-pin inclination the wheel aligner axis N and N' is inclined to the plane of the king-pin inclination roughly by the eye or by the car specifications, the wheel is turned to a 20 degree setting as determined by the scale 17 with the tire pointer 31 bearing against the tire as at 32 Fig. 21, and the felloe pointer touching the tire as shown by dotted lines. A mark is now made on the tire across the flat face of the pointer 31. Now move the aligner back away from the wheel and turn the wheel through 20 degrees for the next setting. Move the aligner up to the wheel and touch the pointers to the tire and felloe and see if the pointer is above or below the mark made on the tire. If it is below incline the axis of the aligner more and if above incline it less and test again. Repeat this operation until the inclination of the aligner is such that the pointer 31 touches the mark on the tire at each of the 20 degree settings. The scale 33 and pointer will then indicate the king-pin inclination, and when this condition is reached the line N, N' will be parallel with the line M, M' which is the true king-pin inclination.

The line A and A' and the line B and B' are parallel and intersect the points of contact 32 and 33a and 34 which are the points intersected by an arc described when the wheel is turned to the 20 degree positions, and these lines are at right angles to the actual king-pin inclination.

Both front wheels are checked in this manner and it may be found that the king-pin inclination is not the same for each front wheel. This difference may be due to several causes. It may be a bent axle or a bent wheel spindle. As an example suppose the right wheel shows one degree of camber and the left wheel one quarter degree of camber, when the king-pin inclination is checked it should read, let us say, 7 degrees on the right wheel and 7¾ degrees on the left side. This would indicate that it was a bent axle rather than a bent spindle. Again, let us say that we have one degree of camber on the right and ¼ degree on the left wheel, and we have 7 degrees of king-pin inclination on both right and left sides. This would indicate that the left spindle was bent ¾ degrees and in such a case it would mean the replacement of the bent spindle rather than a change in the axle, because to bring the axle to a correction that would give one degree of camber would make a decided error in the king-pin inclination. In other words, we would lower king pin inclination to 6¼ degrees on the left side and the car operating with an unequal king-pin inclination would not only "wander" and wear the tires badly but it would be decidedly unstable at high speeds.

It is seen from the foregoing that it would be decidedly dangerous to correct camber without first checking king-pin inclination and correct it before making correction in camber. After once getting king-pin inclination correct for the car under test a bending of the axle to correct camber will not change the king-pin inclination in relation to the wheel having the camber corrected.

Toe-in

Figure 12:
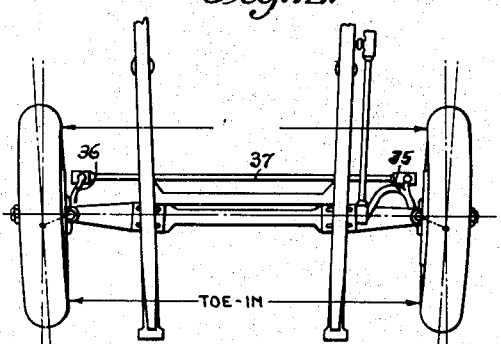
Figure 12 is a plan view of Figure 11 showing the pivot point or convergence of the several angular adjustments applied to the front wheels of automobiles.

Toe-in is the next check in order of sequence. Fig. 12 will show what is meant by toe-in and is the condition where the front of the wheels are turned inward toward each other. Cambering the wheels outward at the top makes it necessary to draw them in at the front. A cambered wheel, is in effect, of smaller diameter on the outer side than on the inner even though the camber is slight, some means, therefore, must be used to prevent one side constantly tending to creep ahead and constantly slipping back and the other side from lagging behind and constantly having to slip forward. Unless these tendencies are corrected there will be excessive tire wear. The toe-in is made so that the setting of the wheel will be in a position to reduce to the minimum the road friction on the tire.

In order to check toe-in the aligner on one side is set up against a wheel and the wheel adjusted until the pointer rests on zero on scale 17 which indicates that the wheel is pointing straight ahead. The aligner on the other side is now set up to the wheel and a reading of toe-in is taken from the scale 17. This shows the actual toe-in of the wheels. Since toe-in and camber are so closely related they must have a fairly constant relationship. High camber requires high toe-in. Low camber requires low toe-in. A satisfactory relationship between camber and toe-in would exist with a camber of one inch and a toe-in of ¼ inch.

To correct toe-in or toe-out it is only necessary that the length of the tie rod be adjusted, but final adjustment for toe-in must not be made if toe-out or steering geometry is off, because then a defective spindle might have to be replaced. It is, however, necessary to first correct toe-in before a correct toe-out reading can be obtained, so if toe-in is not correct, correct it and then take the toe-out or steering geometry reading. It is important that this reading be correct in accordance with the car manufacturer's recommendations.

Toe-out on curves or steering geometry

This is a very important and necessary adjustment on a car because about sixty per cent of the car's travel is done with the front wheels turned more or less from a straight ahead position, especially in city driving.

Figure 14:
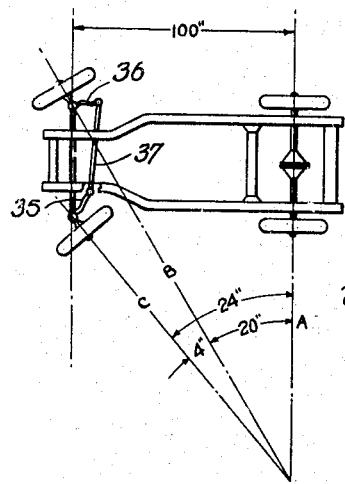
Figure 14 is a diagram illustrating the position of the front wheels when turning a corner and shows very clearly the need for toe-out on the curve.

By referring to Fig. 14 it will be seen why the toe-out on the curves must be accurate. In this view the wheel base is taken as 100 inches and the proper positions of the wheels on a turn would be 20 and 24 degrees respectively as shown. This differing angle of the two front wheels is necessary so that the radius lines of both front wheels will intersect the radius line through the axle of the rear wheels.

Cars with improperly set toe-out wheels will cause excessive tire wear. In going around a curve the centrifugal force throws the weight of the car on the outside wheel, in the case in Fig. 14 the right hand wheel, the car therefore travels on a curve governed by the outside wheel, and the inside wheel having been turned beyond or short of its proper position, is forced into a side drag that causes extremely rapid tire wear. This condition accounts for the cars sometimes found that persist in wearing out one front tire twice as fast as the other, although for straight driving there would be no excessive tire wear.

The mechanical means used to give the inside wheel on a curve, left or right, a greater degree of turn is in the setting of the spindle or plane arms at an angle instead of straight back. It is plain that if they were set at right angles to the axle, and pointing straight backward, any movement of the tie rod would cause them, and therefor the wheels, to move always parallel to each other and with uniform movement.

Referring to Fig. 14 the position of the "plane arms" 35 and 36 will be seen to have assumed different angles relative to the axle. The points of the plane arms that connect with the tie rod turn on the king-pin as a pivot and therefore describe an arc around the king-pin. It is seen that the arm 35 has closely approached a position on its arc of turning that is close to the axle and that movement along the arc gives very little movement to the tie rod 37, while the arm 36 is just traveling along the arc in substantial parallelism with the axle so that the movement along the arc is about equal to the movement of the tie rod. This condition naturally imparts more angular movement to the wheel mounted on the spindle 35 than to the wheel on the spindle 36 although both are moved by the same tie rod through the steering assembly. In the manufacture of the cars the angles of the plane arms are accurately determined by the factory for the different wheel bases of the cars made so that unless the arms become bent through damage or otherwise the angles on new cars are usually correct so that any slight lengthening or shortening of the tie rod 37 will enable the operator to adjust the wheels for toe-out so that they will turn on the proper radius lines.

Figure 13:
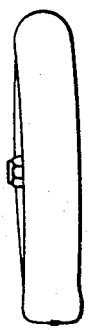
Figure 13 is an enlarged view of an automobile tire showing the convergence of the several angles in relation to the tire tread and the road surface.

The spot on the tire tread that rests on the road due to camber, the spot that rests on the road due to caster and the spot that rests on the road due to king-pin inclination should be substantially a single pivot point for the tire, in other words these three angles should converge to a single pivot point in order to have the tire roll and turn freely and without undue tire wear. This desirable condition is illustrated in Figs. 12 and 13 and also 11.

Referring back for a brief period to the correction of camber.

It was said that a camber correction is made by bending the axle between the spring pads and the wheels. In this correction it is very essential that the weight of the car is on the wheels and that the tires are properly inflated and the front wheels resting truly and central on the turntables 3. The special feature in the turntable assembly that permits of changing the camber of the wheels with the weight of the car resting thereon without injecting side strains in the wheel and axle connections resides in the fact that in addition to the circular movement of the turntables under the movement of a wheel the turntables also have a lateral or cross movement, due to the transverse slot 26. This slot permits a wheel to slide sideways through frictional contact of the tire and the turntable. As the camber angle changes due to bending the axle the friction of the tire on the turntable will move the turntable sideways and thereby a checking of the camber adjustment is visibly possible while the bending is taking place. The aligner can be set up close to the side of the tire and the desired camber angle set by means of the scale 18 and then as the axle is being bent the operator's eye can rest continually on the side of the wheel and the aligner and ascertain quite accurately when the bend is sufficient to give the desired camber setting. This condition permits of making a camber adjustment without in any manner disturbing the position of the wheel on the apparatus, and a setting that is accurate because the camber is set with the weight of the car absorbed and whatever bend is given to the axle the adjustment will be reliable. When the car is first driven on the turntables the wheels will rest substantially central therewith, but if they do not the first test for caster which requires that the wheels be turned through 50 degrees will automatically set the turntables central because there is a slight rolling forward and back as the wheel is turned through the 50 degrees for testing the caster. This first test therefore positions the wheels quite accurately for the tests to follow.

If the turntables should happen to be at the ends of the slots 26 when the car is first positioned they can be moved substantially central by hand so that when the caster check is made they will then automatically center with the wheels as they are turned in the opposite positions.

With the ball bearing and laterally moving turntables it is now possible to check the steering geometry assembly which includes checking the steering wheel, steering column, steering housing assembly, pitman arm, drag link, spindle arms, tie rod, king bolt bushings and wheel bearings.

As an example, with the front wheels on the turntables we have a steering effort at the steering wheel about equal to a five mile speed on the road and we can easily locate any errors whatsoever in the steering assembly as mentioned above. In addition we can check at exactly what turning degree the play, bind or error may be taking place by contacting the aligner to the wheel and taking the reading on the radius scale 17. This is a very valuable check when a car is equipped with cam and lever or split nut type of steering as they are inclined to wear slightly in the straight ahead and when going around a turn they often bind, increasing steering effort considerably. This bind and its exact location can be easily found by the scale readings so that the worm or split nuts can be removed and replaced or ground to accuracy.

Another very important feature of the invention is the facility with which the rear axle housing assembly of the car can be checked. This operation is accomplished by backing the car onto the apparatus, centering the wheels on the turntables and checking the alignment thereof. If the rear wheels are not in proper alignment there will be excessive tire wear and very inefficient braking condition. These conditions are usually due to defective rear housings or hubs.

Another feature of importance embodied in the invention is the wheel base scale located near the rear end of the runways and indicated by the numeral 27, by means of which the wheel base of the car can be determined quite accurately by simply aligning the scale markings with the rear wheel hub by the eye, assuming of course that the front wheels are resting substantially centrally over the turntables. For a more accurate measurement of the wheel base a plumb bob can be dropped from the rear hub and the scale line intersected will be the wheel base of the car.

Figure 16:
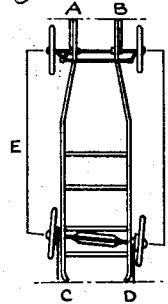
Figures 16, 17, 18 and 19 are chassis misalignment diagrams.
Figure 17:
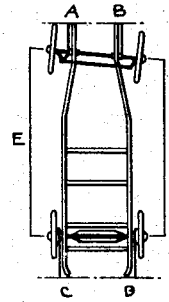
Figure 18:
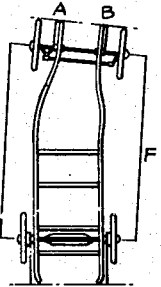
Figure 19:
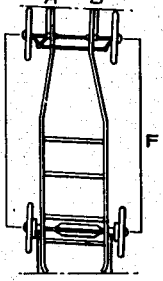

Figs. 16, 17, 18 and 19 are diagrammatic views indicating other misalignment of chassis frames that may be easily determined by means of the scales 27 in connection with simple and easily available hand tools and devices. Fig. 16 shows a "swung rear end" which would be manifest from a measurement of the wheel base on each side of the car. Fig. 17 shows a "swung front end" which again is determined by measuring the wheel base by the scales 27 on each side of the car. Fig. 18 shows a "swayed or bent frame" which again shows a different wheel base measurement, while Fig. 19 shows a "diamond shaped frame" which also shows different wheel base measurements for the two sides of the car. To facilitate these findings a plumb is effective in quick determination.

Figure 15:
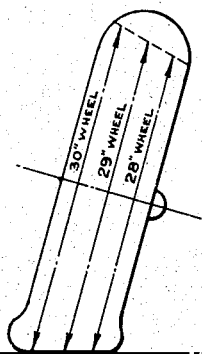
Figure 15 is a view of a balloon tire of low normal pressure to clearly show the difference in diameter of the different sections or through different vertical planes of the tire when it rests on the road and supports the car.

By reference to Fig. 15 it will be seen how a very serious complication has crept into the front wheel assembly and caused untold trouble until it is corrected by proper adjustments of the angles of the wheels.

This figure represents a large balloon tire having a greatly exaggerated camber setting to illustrate clearly just what takes place with these oversize tires. It is seen that the camber has produced a condition where three different diameter tires are trying to rotate at the same speed on the same spindle. On the outside of the tire we have a 28-inch wheel, on the center we have a 29-inch wheel and on the inside we have a 30-inch wheel.

The result of this condition, obviously, would be an "averaging up" of these tendencies of the various parts of the tire to rotate at different speeds. The outer part of the tread would tend to fall back because of its smaller diameter, and would constantly be dragged ahead in order to keep up. The inside part, on the contrary, would tend to pull ahead of the rest of the tread, because of its greater diameter, and would constantly slip back to keep its relation to the adjacent sections of the center tread and the side walls. This effect would be a continual twisting of the flat area of the tire which is in contact with the road, resulting in a grinding away of the rubber on the edges of the tread. The center of the tread, which would govern the actual rate of revolution, would remain comparatively unworn, since the pull on one side and the drag of the opposite side would offset each other.

Figure 24:
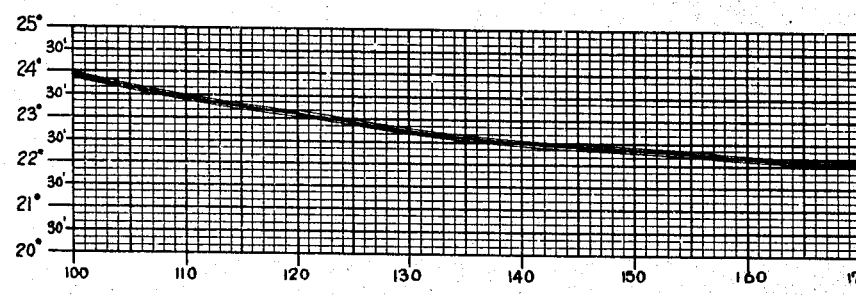
Figure 24 is a toe-out chart.

Referring back to the subject of toe-out on the curve it should have been stated that the proper degree of angular adjustment of the wheels for different wheel bases has been calculated and is immediately available through the medium of a toe-out chart as illustrated in Figure 24. Assuming the wheel base of the car is 130 inches, then to find the angular adjustment of the inside wheel the intersection of the 130 vertical line on the chart with the curved line is just a little short of 23 degrees which is the angular adjustment the wheel should have in order to turn in proper relation to the outside wheel and the radius line of the rear wheels. This chart is calculated for a 20 degree checking condition as has been explained. In order now to adjust the inside wheel the aligner as set up to the outside wheel and it is set to 20 degrees, the other aligner is then set to the inside wheel and this wheel is set to approximately 23 degrees or a little short of that. The adjustment being accomplished by shortening or lengthening the tie rod 37 and after each change in tie rod length a checking should be made from a 20 degree setting of the outside wheel until the angle of the inside wheel is the degrees desired.

Figures 16 to 19 are diagramatic views illustrating bent chassis frames and misalignment of the front and rear axles. Figure 16 illustrates an instance where the rear axle has been moved out of alignment with the chassis and is easily determined by measuring along the lines "E" "F" from the hubs of the front axle to the hubs of the rear axle.

Figure 17 shows an instance where the front axle has been moved out of alignment with the chassis and is determined by measuring along the lines "E" "F".

Figure 18 shows an instance of a bent chassis frame and also shows a discrepency in the measurment of the lines "E" "F".

Figure 19 shows an instance where both the front and rear axles are out of alignment with the chassis, in combination with a bent chassis.

These diagrammatic views are more or less exaggerated to clearly show the misalignments on this small scale and do not indicate the actual misalignments that occur. Of course with the body on the chassis the misalignments are not as readily determined as they appear on these views so that additional measurements should be made to determine just what the misalignment is. For example, in Figure 16 a straight edge or a taut line placed across the outside faces of the tires would indicate at once that the rear wheels were out of alignment with the front wheels. The alignment of the front wheels could easily be determined by measuring from the front ends of the chassis points "A" and "B" to the front axle and if these measurements were found correct then it would be evident that the rear axle was out of line with the chassis. The chassis could be checked for alignment by measuring between lines drawn across points "A" and "C" and "B" and "D", if these were found correct then it would be certain that the rear axle was out of alignment.

The same checks would hold true for the condition of Figure 17.

In Figure 18 where neither of the axles have slipped relative to the chassis but are still out of alignment, the fact that the chassis was bent would be indicated by measuring from "C" and "D" to the rear axle and from "A" and "B" to the front axle, when it would be found that the measurements would check correct but a measurement between lines stretched across points "A" and "B" and points "C" and "D" would at once show where the trouble was because one dimension would be short and one long of what they should be.

The same set of measurements would likewise check the misalignments disclosed in Figure 19.

What we claim as new and desire to secure by Letters Patent is:

1. An automobile wheel aligning device comprising a runway for an automobile, auxiliary means along said runway for contacting with the automobile wheels and guiding them to an aligned position thereon, said means being adjustable laterally to accommodate different tread widths.

2. An automobile wheel aligning device adapted to check the camber of a wheel comprising a vertically swingable bracket, means for contacting with the top and bottom sides of a tire, the bottom contact having means to compensate for the bulge of the tire and means for indicating the degree of wheel inclination.

3. An automobile wheel alignment checking device comprising means for contacting with the top and bottom sides of a wheel with the weight of the car thereon, the bottom contact having an angular face to compensate for the bulge of the tire and means for indicating the degree of inclination of said wheel.

JAMES W. MORSE.
ALVIN I. MOORE.
CHARLES S. PHILLIPS.